A. M. COREY.
Buggy Top.
No. 4,104.
Reissued Aug. 23, 1870.
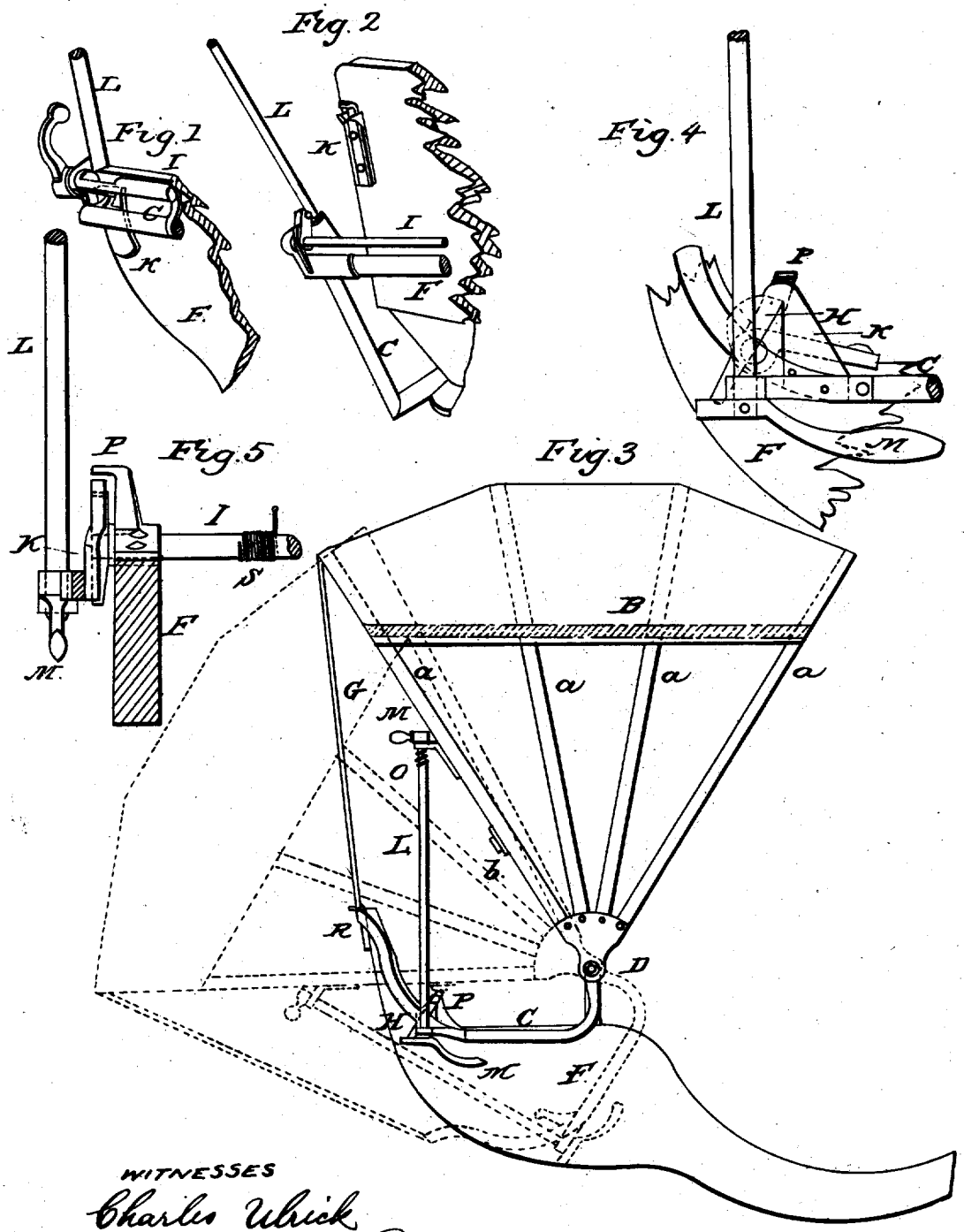
WITNESSES
Charles Ulrick
Joseph C. Noe,
INVENTOR
A. Morrell Corey, M. D.
N. PETERS, Photo-Lithographer, Washington, D.C.

United States Patent Office.

A. MORRELL CORY, OF NEW PROVIDENCE, NEW JERSEY.

*Letters Patent No.* 97,479, *dated December* 7, 1869; *antedated November* 20, 1869; *reissue No.* 4,104, *dated August* 23, 1870.

IMPROVEMENT IN BUGGY-TOPS.

The Schedule referred to in these Letters Patent and making part of the same

I, A. MORRELL CORY, M. D., of New Providence, in the county of Union and State of New Jersey, have invented certain Improvements in Buggy-Tops, of which the following is a specification.

The design of my invention is to provide for letting down the tops of buggies or other vehicles of any required size, on wheels or runners to which they may be applied, in the most convenient manner, from the inside or outside, without collapsing the frame-work and curtains or cover, and in thus preserving the expanded form of the top in retroversion, to secure the curtains from wrinkling and fretting out, which damages both for service and the appearance of the top.

*Description of the Accompanying Drawings.*

Figure 1 represents the shaft I and the tumblers H in a simplified form, or a section of a half-round bar, with outside handles only, for a child's coach.

Figure 2 represents the shaft I located in the base of the top and moving with it.

Figure 3 represents the top erect; its preservation of form when retroverted is shown by the dotted outline in the same figure.

Figure 4 represents a section of the base C, the prop L, the tumbler H, and the stop K, when in bearing.

Figure 5 represents a subsection of the same, showing the extension of the communicating-shaft I across the vehicle with a spring applied to it.

1. The top is made up with the bows *a* expanded or divergent, and preserved in this form always by the bars B running from front to rear and secured to the bows; the same may be done by other devices naturally suggested, or the prop in common use may be applied in their stead.

2. The base C, affording permanent form for the rear and sides of the top at its base and attachment, in part for the supporting and operating mechanism, and for the curtains or cover is fitted to suit the form of the seat, or body of the vehicle or any attachment thereto, and to allow the desired retroversion or action of the top; being permanent in its relation to one or more of the bows, and rotating with them, it may be an extension or fixture of one or more of them. It is pivoted, as at D, on the seat, or body, or an attachment thereto; or, it may be fixed to the bows, or their mountings, or slat-irons, or be pivoted at any point for the best effect. The object desired and attained in applying the said base C, and placing it in permanent connection with the top, or, as a part of it, to swing with it and carry the lower parts of the cover or curtains, is the retaining of the same tension of the cover or curtains they have when the top is erect, or the keeping of them unflexed and unbroken when the top is let down or retroverted.

3. I attach two or more posts, G, permanently, the upper end to the rear bow, and the lower end to the base C, to assist in preserving the top in its expanded form, or form the framework for the rear upright lines. To these posts the curtains may be attached.

4. Near the rear corners of the seat, body, or top, is placed a tumbler, H, working on the principle of a lever, inclined plane, or cam; one is mounted on the shaft I at or near each end of it. Moving under the stop K, it gives the erected top a firm bearing or support, wedging under tightly to prevent rattling and undue wear. In fig. 2 the shaft and tumblers are located in the base of the top and move with it, the stop K being fixed and the tumbler rising upon it. In fig. 3 a half round bar serves as shaft and tumblers, the bottom edge turning upon the stop when the top is erected. The cams may be fixed upon the props L L, the shaft I uniting them for the desired concert of action on the two sides or corners.

5. The shaft I extending across the vehicle or top from side to side, secures, or serves to readily afford, communication and such concert of action between duplicated parts of the mechanism, that the desired action or retroversion of the top may be produced by manipulation through any one of the levers or handles, M M, or most convenient points of access, either inside or outside of the vehicle; it may carry or connect the tumblers or counterparts, or be so formed as to be a substitute for them in itself, as it forms the necessary connection between the counterparts on the two sides, corners, or rear of the vehicle or top. The shaft and tumblers are armed with one or more springs, as at S, to give them the required power.

6. The stop K is secured to the base C to act as a pawl and bear upon the tumbler. It is duplicated, and may be fixed to the seat, or body, or a fixture of them, it being used in support of the top when erected.

7. L L are props, at either side of the top, made to turn, one end in a bearing, attached to one of the bows, and the other end in a bearing secured to the base C. They have levers or handles, M M, at or near the upper end on the inside of the top, and at or near the lower end on the outside of it; or, they may be combined and protrude through the curtain. In action, motion is given to the shaft and tumblers by the lever M through the drop L, releasing the stop K, when, by its own gravity, the top is retroverted; it may be steadied in its decline by the same grasp of the lever. The props L are shouldered, to act as braces, and may be used without the posts G. They are armed with springs to prevent rattling and give them position. They may have the tumblers or cams placed upon them, being really, or readily, united by the shaft I.

8. The guard R at the corners is used in limiting the action of the top; also, being carefully adjusted, it serves to guide the base into locking position and prevent lateral motion in its relation to the body; it may be in combination with the stop K, and be slotted and packed to provide against rattling.

9. The rest P, projecting outwardly, is applied near the rear corners to support the top when retroverted. It may be in conjunction with the stop K and guard R.

10. The boss *b*, projecting inwardly, is attached to one or more of the bows to insure a safe support on the rest P; this, with other points of contact, may be fortified with pads to prevent rattling and inordinate wear.

I claim as my invention—

1. The combination of the bows *a* with the bars B, or their equivalents; the base C, and posts G, or their equivalents, permanent in their relation to one another, and turning upon the axis D, substantially as and for the purposes specified.

2. The combination of the mechanism adapted, effecting the support and acquirability, and limitation of action of the top, the shaft I, the tumblers H, the props L, the stops K, the rests P, the guards R, and the bosses *b*, or their equivalents, substantially as and for the purposes specified.

A. MORRELL CORY, M. D.

Witnesses:
E. J. CORY,
C. NEVILLE.